United States Patent [19]

Cramer et al.

[11] Patent Number: 5,109,589
[45] Date of Patent: May 5, 1992

[54] PROCESSES FOR MAKING METAL PROTOTYPE PARTS

[75] Inventors: Paul S. Cramer, Naugatuck; Gary M. Lomasney, New Britain; Joseph J. Parkos, Jr., East Haddam, all of Conn.

[73] Assignee: United Technologies Corporation, Hartford, Conn.

[21] Appl. No.: 667,782

[22] Filed: Mar. 11, 1991

[51] Int. Cl.⁵ .................... B22D 19/06; C25D 1/02
[52] U.S. Cl. .................... 29/527.4; 29/424; 29/527.3; 29/527.6; 29/DIG. 12
[58] Field of Search .............. 29/447, 458, 423, 424, 29/527.1-527.6, DIG. 12, 904; 174/35 R; 204/2-9, 281; 264/22; 427/54.1

[56] References Cited

U.S. PATENT DOCUMENTS

| | | | |
|---|---|---|---|
| 1,151,317 | 8/1915 | Wood | 204/9 X |
| 1,151,318 | 8/1915 | Wood | 204/9 X |
| 2,335,060 | 11/1943 | Harris | 204/9 |
| 4,211,617 | 7/1980 | Hunyar | 204/6 X |
| 4,313,801 | 2/1982 | Walter et al. | 204/281 X |
| 4,428,801 | 1/1984 | Dugan | 204/281 X |
| 4,534,831 | 8/1985 | Inoue | 204/4 |
| 4,575,330 | 3/1986 | Hull | 264/22 X |
| 4,696,722 | 9/1987 | Towlson | 204/6 |
| 4,752,498 | 6/1988 | Fudim | 427/54.1 |
| 4,801,477 | 1/1989 | Fudim | 427/54.1 |
| 4,840,064 | 6/1989 | Fudim . | |
| 4,863,538 | 9/1989 | Deckard | 264/58 X |
| 4,923,572 | 5/1990 | Watkins et al. | 204/6 |
| 4,929,402 | 5/1990 | Hull | 264/22 |

FOREIGN PATENT DOCUMENTS

| | | | |
|---|---|---|---|
| 10720 | of 1884 | United Kingdom | 204/9 |
| 10451 | of 1885 | United Kingdom | 204/9 |

Primary Examiner—Joseph M. Gorski
Assistant Examiner—Peter Dungba Vo
Attorney, Agent, or Firm—James M. Rashid

[57] ABSTRACT

Processes for making metal prototype parts are described. The key steps of the invention include: making a computer aided design (CAD) file of the prototype part; modifying such file a first time to produce a file of a first mandrel upon which the part will be formed; modifying such file a second time to produce a second mandrel upon which a metal anode will be formed, the anode and first mandrel then being used in an electroplating process to form the prototype. Stereolithographic techniques are preferred for making the mandrels out of polymeric materials.

31 Claims, 3 Drawing Sheets fig. 1

PROCESSES FOR MAKING METAL PROTOTYPE PARTS

TECHNICAL FIELD

This invention relates to processes for making metal prototype parts. In particular, it relates to processes for making metal prototype parts using computer aided design (CAD) and electroplating techniques.

BACKGROUND

Many processes are known for making prototypes of engineered components. Woodworking techniques have long been used, and find continued use in many industries. Metalworking techniques have also been used; metal prototypes are machined from solid forgings and castings, and they are also fabricated from sheet metal. Obviously, woodworking and metalworking techniques require significant levels of skill, as well as a significant amount of manipulation by the human hand. They also require detailed engineering drawings of the prototype which define its geometry and dimensions. After the prototype is made, it is inspected to verify whether or not it conforms to the drawing; if it doesn't, the prototype is remade. And even if the prototype conforms to the drawing, the designer or engineer may wish to modify a feature of the prototype, which requires a modification of the drawing and repetition of the prototype fabrication and inspection process.

Presently, there is a significant effort being put into the development of processes for making prototypes directly from computer aided design (CAD) files. See, for example, U.S. Pat. Nos. 4,929,402 4,575,330 to Hull, and 4,863,538 to Deckard, and 4,752,498 to Fudim. According to the processes described in these patents, prototypes are formed using apparatus which interprets a CAD file of a part and then guides an energy beam, such as a laser, onto a medium capable of solidification when impinged upon by the beam. The prototype part is built up layer by layer, by forming and joining together adjacent cross sectional layers to each other.

Processes of the type described above are referred to as rapid prototyping processes; they are particularly adapted for making prototype parts having internal and external surfaces, such as parts having a hollow internal cavity. Each cross section, or layer, for such types of parts is defined by closed curves; an inner closed curve represents the internal surface of the part and an outer closed curve represents the external surface of the part. The distance between the curves corresponds to the part thickness at that cross sectional layer.

Much progress has been made in the effort to reduce the amount of time and money required to produce prototype parts. However, the prototypes produced using the CAD based processes in the above mentioned patents typically have a polymeric composition. Testing or use of such parts in high temperature or high stress environments cannot readily be performed for obvious reasons. Metal prototypes can be tested in such environments, but the prior art does not describe processes for making such parts rapidly and cost effectively. Accordingly, what is needed is a rapid and cost effective process for making metal prototype parts. This invention satisfies such needs.

SUMMARY OF THE INVENTION

According to this invention, a process for making a metal part having internal and external surfaces, and a thickness, comprises the steps of: making a first mandrel having a surface upon which the metal part is made; the first mandrel fabricated by forming and joining together adjacent mandrel cross sections; making a second mandrel having a surface upon which a metal anode is made, the metal anode used in making the metal part on the first mandrel surface, the second mandrel fabricated by forming and joining together adjacent mandrel cross sections; depositing a layer of metal into contacting relation with the surface of the second mandrel to form the metal anode; removing the metal layer from the surface of the second mandrel and then assembling the first mandrel with respect to the metal layer (the anode) such that the surface of the first mandrel and the contacting surface of the metal layer are in opposing relation to each other and are spaced apart a uniform distance greater than the part thickness; placing the assembly in an electroplating solution, making the first mandrel cathodic and the metal layer anodic, and plating metal onto the surface of the first mandrel, wherein the thickness of the plated metal on the first mandrel is at least equal to the desired part thickness; and then removing the plated metal layer from the surface of the first mandrel, whereby the plated metal layer is the metal part.

The process of the invention can be used to produce axisymmetric parts as well as parts which are not symmetrical about an axis. In the case of the production of axisymmetric parts, the mandrel and the anode are assembled in coaxial relationship with each other, such that the first mandrel surrounds the metal anode in the mandrel-anode assembly, and current flows from the anode to the mandrel (the cathode) in a radially inward direction. Alternatively, the first mandrel may be surrounded by the anode, such that current flows in a radially outward direction.

Rapid prototyping processes such as those of the stereolithography type are preferably used for fabricating the first and second mandrels. CAD techniques are used for generating computer files of the part and mandrels; the computer files are then interpreted by the computer based stereolithography apparatus to make the mandrels.

The process is particularly useful for rapidly making metal prototype parts in a cost effective fashion. In most instances, the parts can be made at a fraction of the time and cost of conventional prototype part fabrication processes.

BRIEF DESCRIPTION OF THE DRAWINGS

FIG. 5 shows perspective views of the prototype, and inner and outer mandrel, all aligned with respect to an x, y and z axis.

FIG. 6 shows a top view of the prototype and mandrels of FIG. 5.

BEST MODE FOR CARRYING OUT THE INVENTION

Figure 1A:
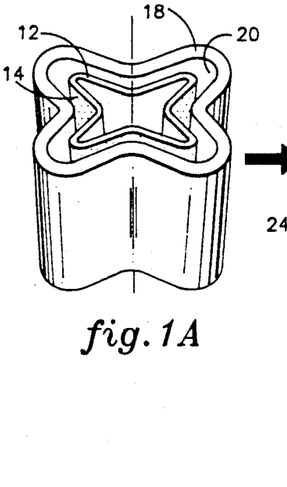
FIG. 1 is a simplified view showing some of the key steps of the invention, as represented in FIGS. 1A, 1B and 1C.
Figure 1B:
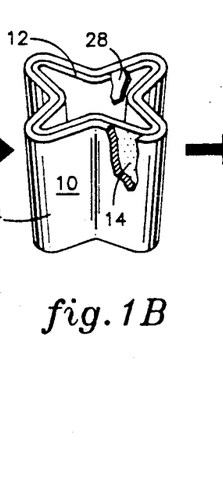
Figure 1C:
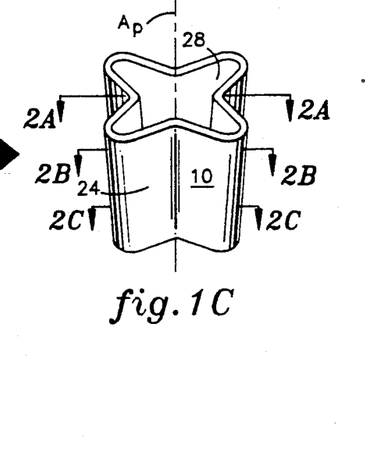

An understanding of the important aspects of this invention, and of the components and apparatus used in carrying it out, may be attained by referring to FIGS. 1A, 1B and 1C. A prototype made in accordance with the invention is shown in FIG. 1C, and is represented by the general reference numeral 10. In forming the prototype 10, metal is plated onto the external surface 14 of a mandrel 12, using an anode and cathode assembly as shown in FIG. 1A. The anode is represented by reference numeral 18 and the cathode is represented by reference numeral 12. The cathode 12 at the completion of the plating process, with the prototype part 10 on its surface, is shown in FIG. 1B. The external surface 14 of the mandrel 12 (i.e., the cathode) has the same geometry and dimensions as the internal surface 28 of the prototype 10. The metal anode 18 used in the plating process which produces the prototype 10 is configured to conform to the cathode 12, so that during the plating process, a uniform thickness of metal is deposited on the external surface 14 of the cathode 12. The anode 18 is made during an intermediate step of the invention process; it has an internal surface 20 whose geometry is the same as (or is very similar to) the geometry of the internal surface 28 of the prototype 10. At the completion of the plating process, the plated metal is separated from the mandrel 12, the plated metal being the prototype 10. Specific features of the invention process are described in additional detail below.

A first step in carrying out this invention is to create a computer aided design (CAD) file of the prototype part of interest. For purposes of this specification and claims, the term "CAD file" means a computer file comprised of data which describes the geometry and dimensions of the prototype; it also means a graphical representation of such data. The methods and apparatus for generating CAD files are well known to those skilled in the art.

Figure 2A:
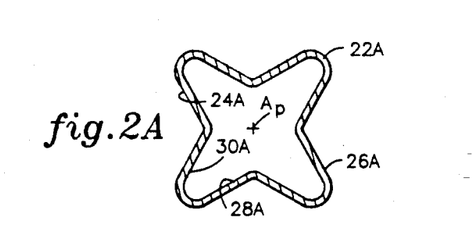
FIGS. 2A, 2B and 2C are cross sectional views through a part made in accordance with the invention, taken along the lines 2A—2A, 2B—2B and 2C—2C, respectively.
Figure 2B:
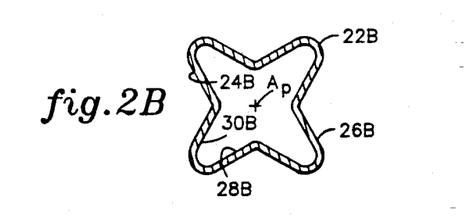
Figure 2C:
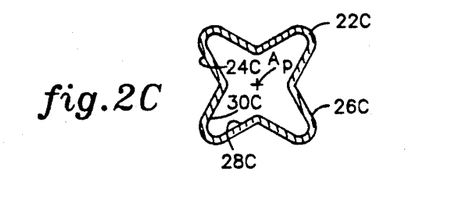

Some of the elements of a CAD file which describe a prototype fabricated according to this invention are shown in FIGS. 2A, 2B and 2C. FIG. 2A is a view of the prototype 10 showing one of its planar cross sectional layers $22_A$. The external surface $24_A$ of the prototype 10 at the section $22_A$ shown in FIG. 2A is defined by an outer closed curve 26 the internal surface $28_A$ of the prototype section $22_A$ is defined by an inner closed curve $30_A$. FIGS. 2B and 2C show two adjacent cross sections $22_B$ and $22_C$ of which the prototype is comprised. (The relative sizes of the cross sections in FIGS. 2B and 2C are slightly exaggerated, for clarity.) FIGS. 2B and 2C also show each cross section's respective external surfaces $24_B$ and $24_C$, and internal surfaces $28_B$ and $28_C$. The external surfaces are defined by outer closed curves $26_B$ and $26_C$, and the internal surfaces are defined by inner closed curves $30_B$ and $30_C$. FIGS. 2A and 1C show the prototype 10 having an axis $A_P$.

Figure 3:
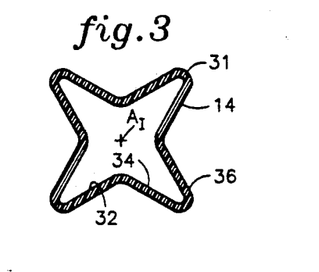
FIGS. 3 and 4 are cross sectional views through mandrels used in carrying out the invention.

In carrying out the invention, a CAD file is generated to form a mandrel 12, which, as is indicated above and schematically shown in FIG. 1A and 1B, is used as a cathode upon which the metal prototype is formed. For clarity, the mandrel 12 is also referred to below as an inner mandrel 12. The inner mandrel 12, like the prototype 10, is comprised of adjacent cross sections 31 (see FIG. 3) defined by closed curves. Only the external surface 14 of the inner mandrel 12 is of importance in carrying out the invention, and the inner mandrel 12 could be solid. However, it is preferred that the inner mandrel 12 be hollow and, as shown in FIG. 3, have internal and external surfaces 32 and 14, respectively, defined by inner and outer closed curves, 34 and 36, respectively. The axis of the inner mandrel 12 is denoted $A_I$.

Figure 4:
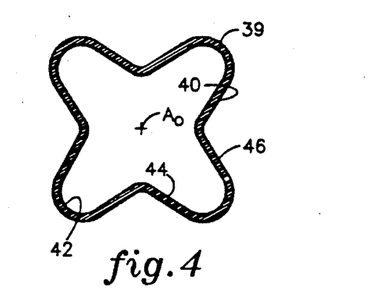

A CAD file is also generated to form another mandrel, referred to below as an outer mandrel 38. As will be described in more detail below, and referring now to the FIGS., an anode 48 is formed by depositing a layer of metal 48 onto the external surface 40 of the outer mandrel 38; the anode is used in the plating step of making the prototype 10. Like the inner mandrel 12 and the prototype 10, the outer mandrel 38 is comprised of adjacent cross sections 39, each cross section 39 having an internal surface 42 and an external surface 40 defined by inner closed curves 44 and outer closed curves 46, respectively. The axis of the outer mandrel 38 is $A_O$.

The CAD file of the inner and outer mandrel may be generated by modifying the CAD file of the prototype part as indicated above, or it may be generated separately and without reference to a prototype file.

Figure 5A:
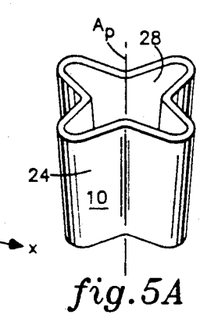
FIG. 5A shows the prototype.
Figure 5B:
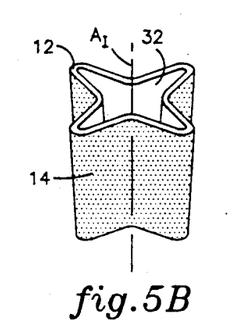
FIG. 5B shows the inner mandrel and FIG. 5C shows the outer mandrel.
Figure 5C:
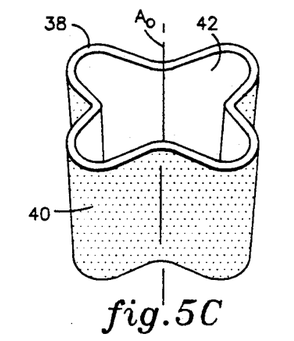
Figure 6A:
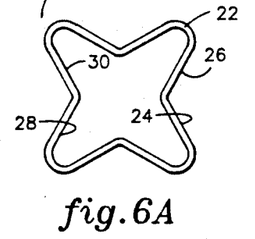
FIG. 6A shows the top view of the prototype of FIG. 5A.
Figure 6B:
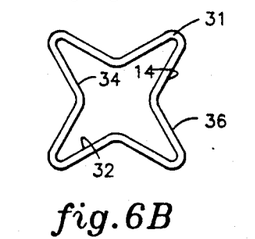
FIG. 6B shows the top view of the inner mandrel of FIG. 5B.
Figure 6C:
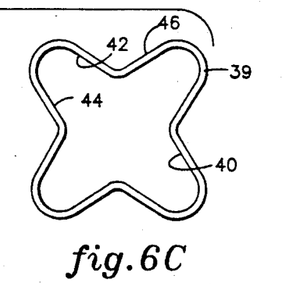
FIG. 6C shows the top view of the outer mandrel of FIG. 5C.

The geometry and dimensions of the inner and outer mandrels 12 and 38, respectively, are closely related to those of the prototype 10, in the manner shown in FIGS. 5 and 6. In FIGS. 5A, 5B and 5C, the prototype 10 and mandrels 12 and 38 are presented in a perspective view, all with the same spatial orientation with respect to the x, y and z axes. The top surfaces of the prototype, and mandrels all lie on the same plane in FIG. 5, and the bottom surfaces of the prototype and mandrels also all lie on the same plane. FIGS. 6A, 6B and 6C show the coplanar top view of the prototype 10 and mandrels 12 and 38. For purposes of this specification and claims, coplanar cross sections of the prototype, inner mandrel and outer mandrel are termed spatially corresponding cross sections, or more simply, corresponding cross sections.

For corresponding cross sections, and with respect to the closed curves of the prototype 10 and the inner mandrel 12, there is no offset between the prototype inner closed curve 30 and the mandrel outer closed curve 36. In other words, the data which define such curves 30 and 36 are equivalent, and the curves 30 and 36 are identical, as are the surfaces that such curves define. Furthermore, for corresponding cross sections, and with respect to the curves of the prototype 10 and the outer mandrel 38, there is a finite offset, greater than zero, between the prototype inner closed curve 30 and the mandrel inner closed curve 44. Likewise, the surfaces that such curves define are offset a finite amount greater than zero. The magnitude of the offset is the same at each corresponding cross section, and is no less than the desired thickness of the prototype 10.

CAD files of the inner and outer mandrels 12 and 38 which comply with the above described guidelines are generated in a conventional manner. The mandrels 12 and 38 are then fabricated from their respective CAD files by any of the aforementioned rapid prototyping techniques; in the preferred mandrel fabrication step, adjacent cross sections of each of the first mandrel 12 are formed and joined together in a sequential fashion using a high energy beam and a liquid polymeric medium capable of solidification when acted upon by the beam. Similarly, adjacent cross sections of the second mandrel 38 are formed and joined together in a sequential fashion using a high energy beam and a liquid polymeric medium capable of solidification when acted upon by the beam. Stereolithography, as described in the patents to Hull, is the most preferred rapid prototyping process for fabricating the inner and outer mandrels 12 and 38. In such process, an ultraviolet source of laser light is guided onto an ultraviolet curable liquid polymeric medium to form and join together adjacent cross sections and thereby produce three dimensional mandrels. Using the stereolithography process, the height of each mandrel cross section is constant. The process can be controlled so that the cross section height is as little as 25-625 microns (2-25 mils), which facilitates the fabrication of mandrels with excellent dimensional conformance to their respective CAD files. The ability to make such mandrels insures that the prototype parts made using the mandrels correspond precisely to the dimensional requirements.

Figure 7:
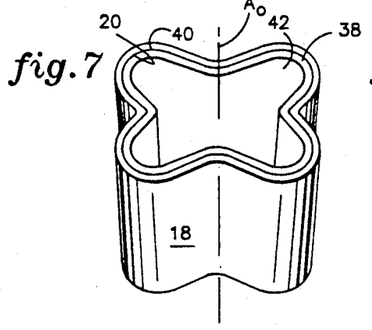
FIG. 7 is a perspective view showing a layer of metal deposited onto the external surface of the outer mandrel.

The next step of this invention is to deposit a layer of metal 18 onto, and in contacting and conforming relation with, the external surface 40 of the outer mandrel 38, as shown in FIG. 7. Ultimately, the layer of metal 18 is used as an anode to deposit metal onto the inner mandrel 12 to form the metal prototype 10, as shown in FIG. 1. Electrolytic and electroless plating techniques, and combinations thereof, are preferred processes for depositing metal 18 onto the outer mandrel 38 to form the anode 18. Other metal coating techniques can also be used, such as plasma or flame spray techniques, as well as physical and chemical vapor deposition techniques. Parameters and techniques for carrying out such processes are well known to those skilled in the art. If electroplating is used to coat the surface 40 of the mandrel 38, thieves or similar such devices may be necessary to achieve a uniform thickness of metal 18. The surface 40 of the mandrel 38 should be activated, by, e.g., application of a thin layer of graphite dry film lubricant, silver paint or by the reduction of elemental silver onto the mandrel surface 40 if plating techniques are used to make the anode.

After the metal layer 18 is deposited onto the outer mandrel 38, the layer 18 is separated from the mandrel 38. The separation process is most preferably conducted in such a manner as to maintain the dimensional and structural integrity of the metal layer 18. In other words, the metal layer 18 is preferably in one or two pieces after it is removed from the mandrel 38. If the mandrel 38 is made from polymeric materials of the type described by Hull, the removal process may be accomplished by combusting the mandrel; by chemically dissolving the mandrel; by embrittling the mandrel (e.g., by quenching it in liquid nitrogen) followed by fracturing the mandrel by force; or by combinations thereof. The resultant, free standing metal layer, eventually to be used as the anode 18, is shown in FIG. 1A. The contacting surface of the anode (i.e., the surface which was in contact with the surface of the outer mandrel) is indicated by the reference numeral 20. The anode 18 has the geometry of the prototype 10, but at each cross section, is offset from the prototype.

Figure 8:
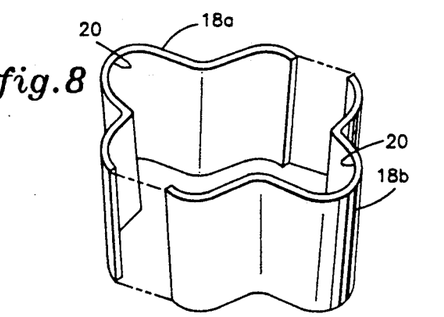
FIG. 8 is a perspective view showing an anode used in carrying out the invention, the anode shown in multiple pieces.

Removal of the metal layer 18 from the mandrel 38 may also be accomplished by sectioning the mandrel 38 (e.g., along its axis) and then removing the metal layer 18 from the mandrel 38 in the manner described above. The result of such a sectioning process is an anode comprised of anode details 18a and 18b, as shown in FIG. 8. The anode details 18a and 18b are assembled into a singular structure, and referred to below as an anode assembly, using bolts, clamps, wires or other such means, when the electroplating process to form the prototype 10 is about to begin.

Figure 9:
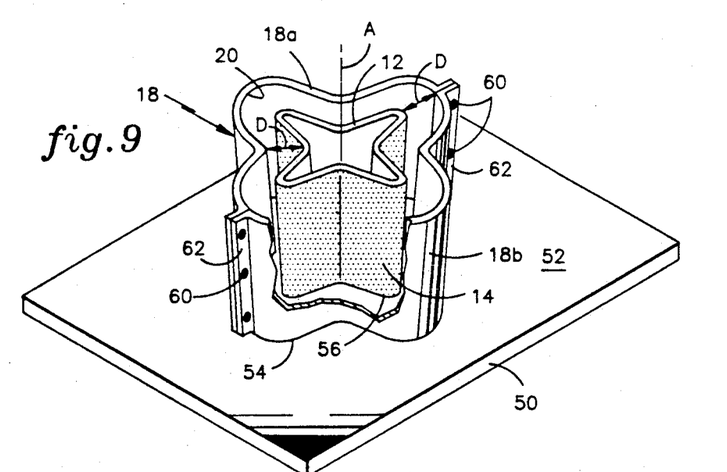
FIG. 9 is a perspective view, partly broken away, showing the manner in which the anode and cathode are assembled in preparation for the electroplating step used to make a metal prototype according to the invention.

In preparation for the electroplating step to form the prototype part, the inner mandrel 12 (the cathode) and the anode 18 are positioned and assembled relative to each other to align corresponding cross sections; the external surface 14 of the cathode 12 and the internal (contacting) surface 20 of the anode 18 are in opposing relation to each other. In such position, the cathode and anode surfaces 14 and 20 are spaced apart an equal distance at each corresponding cross section. As shown in FIGS. 1A and 9, the anode shape conforms to the shape of the cathode, and the anode and cathode are aligned along their common axis A. The best way to align spatially corresponding cross sections is shown in FIG. 9; the anode assembly 18 and cathode 12 are positioned on a fixture 50, such as a rigid plate having a flat surface 52, in such a manner that the axial ends 54 and 56 of the anode assembly 18 and cathode 12, respectively, each lie on the fixture surface 52. A uniform spacing D (see FIG. 9) between the cathode external surface 14 and anode assembly internal surface 20 is achieved by using feeler gages or similar such devices during assembly of the cathode and anode.

In FIG. 9, the anode assembly 18 is comprised of anode details 18a and 18b which are joined to each other through the use of bolts 60 passing through bolt holes (not shown) in flanges 62. The flanges 62 are integral with the anode details, and extend radially outwardly from the anode assembly 58. The flanges 62 are preferably integral with each detail 18a, 18b. The CAD file which describes the outer mandrel 38 is defined such that the mandrel 38 includes integral flanges, and the flanges on the anode details are formed during the steps which form the details themselves.

Conventional electrical connections are utilized to make the metal layer 18 anodic and the inner mandrel 12 cathodic, and conventional electroplating techniques are used to deposit a layer of metal 10 onto the external surface 14 of the cathode 12. To facilitate the deposition of metal onto the cathode 12, the cathode surface 14 should be activated in the manner described above. The electroplating process continues until as much metal is deposited on the cathode 14 to produce a prototype 10 having the desired thickness. The uniform spacing between the anode and the cathode results in a uniform current density during the plating process; the uniform current density promotes the formation of a prototype part in which the thickness at each cross sectional location is approximately the same. At the completion of the plating process, the prototype 10 is removed from the cathode 14 by any of the above mentioned removal techniques. The removal process is easiest if the cathode 14 is hollow. The resulting prototype 10 has the desired thickness, dimensions and geometry, and corresponds precisely to its CAD file.

Figures 10, 10A, 10B, 10C:
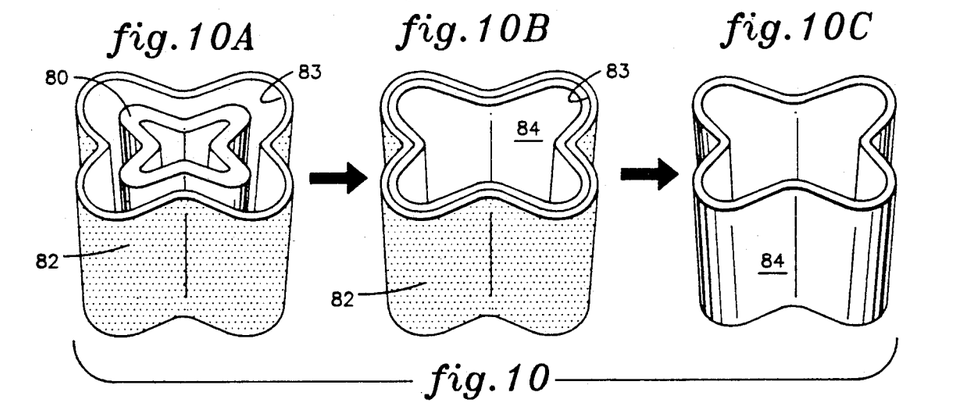
FIG. 10 is a simplified view, similar to FIG. 1, showing the key steps of an alternate embodiment of the invention, as represented in FIGS. 10A, 10B and 10C.

In the preferred embodiment for carrying out the invention, and as indicated by FIGS. 1A, 1B, and 9, the metal prototype 10 is formed on the external surface 14 of the cathode 12. In such embodiment, the cathode 12 is surrounded by the anode 18, and current flows from the anode 18 to the cathode 12 in a radially inward direction. In an alternative embodiment of this invention, and as indicated by FIG. 10, the prototype 84 (FIG. 10C) is formed on the internal surface 83 of a cathode 82 (FIG. 10B); the cathode 82 surrounds the anode 80 (FIG. 10A), and current flows from the anode 80 to the cathode 82 in a radially outward direction. Procedures used to form the anode 80 and cathode 82, as well as the manner in which the anode 80 is used to electroplate metal onto the internal surface 83 of the cathode 82, are generally as described above. The CAD files which are used to fabricate the mandrels for this alternate embodiment of the invention are defined such that, with respect to the closed curves of the prototype 84 and the inner mandrel used to make the anode 80, there is a negative offset between the prototype outer curve and the mandrel outer curve, and between the surfaces that such curves define. The absolute value of the offset is (as it is in the preferred embodiment) no less than the thickness of the prototype 84. With respect to the closed curves of the prototype 84 and the cathode (the outer mandrel) 82, there is no offset between the prototype outer curve and the mandrel inner curve, and between the surfaces that such curves define.

In summary, the steps of this invention for making a metal part having internal and external surfaces, and a thickness are as follows: make a first mandrel having a surface upon which the part is eventually fabricated by forming and joining together adjacent first mandrel cross sections; make a second mandrel having a surface upon which a metal anode is fabricated, by forming and joining together adjacent second mandrel cross sections; deposit a layer of metal onto the surface of the second mandrel to from the anode, such that a surface of the metal layer is in contacting relation with the surface of the second mandrel; remove the metal layer from the surface of the second mandrel; assemble the metal layer and the first mandrel in relation to each other, such that the surface of the first mandrel is in opposing relation to the contacting surface of the metal layer, said surfaces being spaced apart a uniform distance greater than the thickness of the part to be made; place the metal layer and anode assembly in an electroplating solution, make the first mandrel cathodic and the metal layer anodic, and plate a layer of metal onto the surface of the first mandrel; and then remove the plated metal layer from the first mandrel, the plated metal layer being the desired part.

This invention can be utilized to simultaneously fabricate a plurality of metal parts. In particular, multiple anodes and cathodes can be individually fabricated and then assembled, in a manner similar to that described above, within a single electroplating tank (or within multiple tanks). The same type of techniques as those described above are then used to form the anodes and to deposit metal onto each of the cathodes. At the completion of the plating process, the parts produced thereby are removed from each cathode.

In carrying out the invention, the anode may either be of the consumable type or the nonconsumable type. If the anode is consumable, it has a composition which is the same as the desired composition of the prototype part, and its thickness is equal to or greater than the desired thickness of the prototype. Preferably, the thickness of the consumable anode is at least one and one half times the desired thickness of the prototype. If the anode is of the nonconsumable type, it is made from a metal whose composition is more noble than the composition of the prototype part. For example, if the composition of the prototype is nickel, the composition of the nonconsumable anode is platinum, gold or any other metal which is more noble than nickel. Only the surface of the anode which is in opposing relation to the cathode needs to be more noble than the composition of the prototype. As a result, the anode may have a multilayered structure, fabricated by applying a thin layer of plated metal (e.g., a copper strike) to the mandrel used to form the anode, and then applying the noble metal layer onto the plated metal layer. The thickness of the noble metal portion of the nonconsumable anode is not critical, but such a composite anode should have a sufficient thickness so that the anode has structural integrity for the plating process.

As indicated above, the preferred manner for making the mandrels is with the stereolithography processes described in the patents to Hull and Fudim described in the Background Section. Also useful are the solid laser sintering processes described in the patent to Deckard. The contents of these patents are incorporated herein by reference. Other rapid prototyping processes, such as those in which adjacent cross sections are secured to each other through the use of extruded polymeric filaments, laminated fibers (such as paper) and ink jet technology may also be useful in fabricating the mandrels. In such process, the mandrels are fabricated by forming and joining together adjacent cross sections.

When the anode and cathode are assembled together in preparation for the electroplating step to produce the prototype, the surface of the cathode on which the prototype is formed must be spaced apart from the opposing surface of the anode. The magnitude of the spacing must be at least as great as the desired thickness of the prototype; the electroplating process works best if the spacing (inclusive of the prototype thickness) is about 0.6–1.2 cm (about 0.25–0.5 in.). Most preferably, the spacing is about 0.6 cm.

The properties of a prototype made with the invention process may be altered or enhanced by treating the internal and/or external surfaces of the prototype. For example, such surfaces may be roughened or smoothed if a certain surface texture is a desired characteristics of the prototype. The surfaces may also be coated with ceramic, metallic, organic or inorganic coatings, or with combinations thereof. Such coatings may be used to alter the physical and/or chemical properties of the prototype, such as the prototype's oxidation, corrosion, thermal or wear resistance, or its catalytic behavior.

The following example will illustrate features of the invention. It is not to be interpreted as limiting the scope of the invention.

Figure 11:
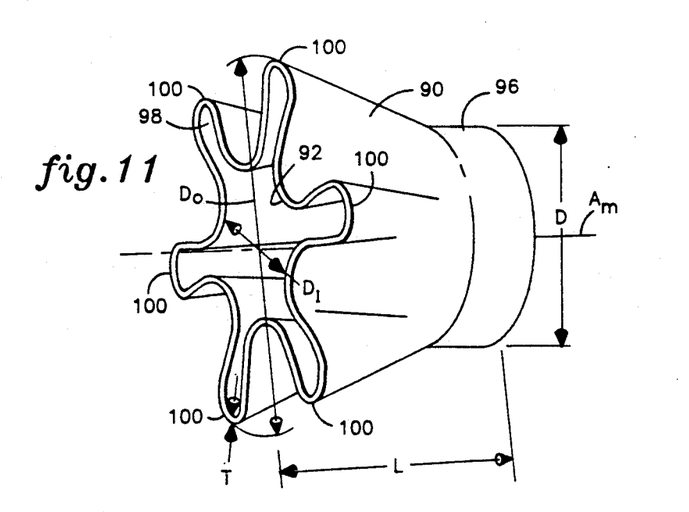
FIG. 11 is a perspective view showing a convoluted exhaust mixer for a gas turbine engine which was made in accordance with the invention.

A metal prototype of an aircraft gas turbine engine part known as a convoluted exhaust mixer was fabricated in accordance with this invention. The prototype 90 is shown in FIG. 11 and was generally cylindrical in shape, having an internal surface 92 and an external surface 94 extending along the axis of the mixer $A_M$. At the forward end 96 of the mixer 90, the prototype had an outer diameter D of about 5.8 cm (2.3 in.). At the rearward end 98 of the mixer, the prototype was characterized by a plurality of convolutions, or lobes 100. The mixer rear end 98 had an outer diameter of about 9.7 cm (3.8 in.) measured at the lobe outer extremes (dimension $D_O$ in FIG. 10), and an outer diameter of about 4.1 cm (1.6 in.) at the lobe inner extremes (dimension $D_I$ in FIG. 10). The length L of the mixer was about 6.6 cm (2.6 in.) and the wall thickness T ranged from about 0.65 to 1.65 mm (0.025–0.065 in.).

CAD files of the mandrels used to make the prototype were generated in accordance with the guidelines described above. The offset between the inner closed curve of the prototype and inner closed curve of the outer mandrel was about 0.6 cm (0.25 in.) at each cross sections, less the thickness of the mandrel. The CAD files of the mandrels were copied into a model SLA-250 stereolithography unit manufactured by 3D Systems, Inc. of Valencia, Calif., and polymeric mandrels were fabricated from a UV curable photopolymer marketed under the brand name XB-5081 by Ciba-Geigy Corp., Ardsley, N.Y. As discussed above, the stereolithography process made the mandrels by forming and joining together adjacent cross sections of each mandrel. After fabrication of the mandrels, their surfaces were cleaned to remove all burrs and rough edges.

The external surface of the outer mandrel was then activated by applying to it a dry graphite film; the surfaces was then nickel plated using a conventional nickel sulfamate plating solution to form the anode. The thickness of the anode ranged from about 1.9 mm (0.075 in.) to about 2.9 mm (0.115 in.); it was on average, about one and one half times thicker than the desired thickness of the prototype.

The anode was removed from the outer mandrel, and was sectioned in half along its longitudinal axis. The external surface of the cathode was then activated by spraying it with a thin layer of dry graphite film. The respective ends of the anode halves and the cathode were positioned upon a flat polyvinylchloride plate, such that the cathode was surrounded by the anode halves, and such that corresponding anode and cathode cross sections were spatially and coaxially aligned. The anode halves and the cathode were positioned on the plate such that the opposing cathode and anode surfaces were spaced about 6 cm (0.25 in.) apart.

The cathode and anode assembly was placed into a conventional nickel sulfamate bath, and the appropriate electrical connections were made. A DC rectifier was utilized to maintain a current density of about 325 amperes per square meter (30 amperes per square feet) during the plating process. To maintain such current density during the process, voltage was increased during the process as the plated area increased, in a manner conventional in the industry. To insure that the nickel ion concentration in the plating bath was maintained at a relatively constant level in the space between the opposing anode and cathode surfaces, nickel sulfamate plating solution was pumped between such surfaces at a plurality of locations during the plating process. Plating continued until the desired prototype thickness was achieved. At the completion of the plating process, the anode and cathode were removed from the tank, and the prototype removed from the cathode.

Although this invention has been shown and described with respect to a preferred embodiment thereof, it should be understood by those skilled in the art that various changes in form and detail may be made without departing from the spirit and scope of that which is claimed. For example, while the invention is particularly suited for making one-of-a-kind experimental prototypes, and is described in such a manner, it is equally suitable for making parts for production (as opposed to experimental) use, and for making parts in multiple quantities, whether such parts be for experimental or production use. Accordingly, while the invention is described in terms of making experimental prototypes, the term "prototype" should not be construed as meaning only singular, experimental components; it also includes production parts.

We claim:

1. A process for making a metal part having internal and external surfaces, and a thickness, comprising:
   (a) making a first mandrel having a surface upon which said part is made, by forming and joining together adjacent cross sections of the first mandrel;
   (b) making a second mandrel having a surface, upon which a metal anode is made, by forming and joining together adjacent cross sections of the second mandrel;
   (c) depositing a layer of metal having a contacting surface which is in contacting relation with the surface of the second mandrel to form the metal anode;
   (d) removing the metal layer from the surface of the second mandrel, and then assembling the first mandrel with respect to the metal layer such that the surface of the first mandrel and the contacting surface of the metal layer are in opposing relation to each other, and wherein said making and depositing steps are carried out such that said surfaces of the first mandrel and the metal layer are spaced apart a uniform amount greater than the part thickness;
   (e) placing the assembly in an electroplating solution, making the first mandrel cathodic and the metal layer anodic, and plating a metal layer onto the surface of the first mandrel, wherein the thickness of the metal layer is greater than or equal to the part thickness; and
   (f) removing the metal layer on the first mandrel from said mandrel.

2. The process of claim 1, wherein the step of making the first and second mandrels comprises:
   (a) generating a computer file of each mandrel; and
   (b) guiding, by means of the file, an energy beam onto a polymeric liquid medium to form and join together adjacent cross sections of each mandrel.

3. The process of claim 2, wherein the energy beam is of the ultraviolet frequency range, and the medium is a photosensitive liquid polymer.

4. The process of claim 2, where said guiding step is conducted such that each mandrel cross section has a section thickness between 25 and 625 microns.

5. The process of claim 1, wherein the process for depositing metal onto the surface of the second mandrel is selected from the group of processes consisting of electrolytic plating, electroless plating, physical vapor deposition chemical vapor deposition and combinations thereof.

6. The process of claim 5, wherein the process for depositing metal onto the surface of the second mandrel is selected from the group of processes consisting of electrolytic plating, electroless plating and combinations thereof.

7. The process of claim 6, wherein the process for depositing metal onto the surface of the second mandrel uses a consumable anode.

8. The process of claim 6, wherein the process for depositing metal onto the surface of the second mandrel uses a nonconsumable anode.

9. The process of claim 1, wherein the first mandrel and metal layer each have an axis, and are assembled coaxial with each other such that the first mandrel is positioned radially outward of the metal layer.

10. The process of claim 1, the first mandrel and metal layer are assembled coaxial with each other such that the first mandrel is positioned radially inward of the metal layer.

11. The method of claim 1, wherein the process for removing the metal layer from the first mandrel is selected from the group of processes consisting of combusting the mandrel, chemically dissolving the mandrel, embrittling the mandrel followed by fracturing the mandrel by force, and combinations thereof.

12. The method of claim 11, wherein said process comprises embrittling the mandrel followed by fracturing the mandrel by force.

13. The process of claim 1, further comprising the step of treating the surface of the metal part.

14. The process of claim 13, wherein said treating step comprises applying a coating to the part.

15. The process of claim 13, wherein said coating is selected from the group of coatings consisting of ceramic, metallic, organic, or inorganic coatings, and combination thereof.

16. The process of claim 1, wherein the first mandrel and metal layer each have an axis, and are assembled coaxial with each other such that the first mandrel is positioned radially outward of the metal layer.

17. The process of claim 1, wherein the first mandrel and metal layer each have an axis, and are assembled coaxial with each other such that the first mandrel is positioned radially inward of the metal layer.

18. A process for making a metal part having internal and external surfaces, and a thickness, comprising:
(a) generating a computer file of the part, wherein the part is comprised of adjacent cross sections;
(b) making a first mandrel from said computer file, wherein said first mandrel has a surface and is comprises of adjacent cross sections, each cross section of said first mandrel corresponding to a cross section of the part, wherein the first mandrel is made by forming and joining together adjacent ones of said mandrel cross sections, and wherein the surface of the first mandrel and the internal surface of the part are offset by an amount equal to zero;
(c) making a second mandrel from said computer file, wherein said second mandrel has a surface and is comprised of adjacent cross sections, each cross section of said second mandrel corresponding to a cross section of said part, wherein the second mandrel is made by forming and joining together adjacent ones of said cross sections, and wherein the surface of the second mandrel is offset from the external surface of the part a constant amount greater than zero;
(d) depositing a layer of metal onto the surface of the second mandrel, and then removing the metal layer from said surface, wherein the layer is comprised of adjacent cross sections, and each cross section of said metal layer corresponds to a cross section of the part, wherein the thickness of the layer is greater than the thickness of the part;
(e) assembling the first mandrel with respect to the metal layer such that corresponding cross sections of the mandrel and metal layer are aligned with each other, and such that at all cross sections, the surface of the first mandrel is spaced from the surface of the metal layer a uniform distance greater than the thickness of the part;
(f) depositing metal having the thickness of the part onto the surface of the first mandrel using the layer, to form the part on the surface of the first mandrel;
(g) removing the part from the surface of the first mandrel.

19. The process of claim 18, wherein the step of making the first and second mandrels comprises:
(a) generating a computer file of each mandrel by modifying the computer file of the part; and
(b) guiding, by means of the mandrel computer file, an energy beam onto a polymeric liquid medium to form and join together adjacent cross sections of each mandrel.

20. The process of claim 19, wherein the process for depositing metal onto the surface of the second mandrel is selected from the group of processes consisting of electrolytic plating, electroless plating, physical vapor deposition chemical vapor deposition and combinations thereof.

21. The process of claim 20, wherein the process for depositing metal onto the surface of the second mandrel is selected from the group of processes consisting of electrolytic plating, electroless plating and combinations thereof.

22. The process of claim 21, wherein the process for depositing metal onto the surface of the second mandrel uses a consumable anode.

23. The process of claim 21, wherein the process for depositing metal onto the surface of the second mandrel uses a nonconsumable anode.

24. The process of claim 19, wherein the energy beam is of the ultraviolet frequency range, and the medium is a photosensitive liquid polymer.

25. The process of claim 19, where said guiding step is conducted such that each mandrel cross section has a section thickness between 25 and 625 microns.

26. The method of claim 18, where the process for removing the metal layer from the first mandrel is selected from the group of processes consisting of combusting the mandrel, chemically dissolving the mandrel, embrittling the mandrel followed by fracturing the mandrel by force, and combinations thereof.

27. The method of claim 26, wherein said process comprise embrittling the mandrel followed by fracturing the mandrel by force.

28. The process of claim 18, further comprising the step of treating the surface of the metal part.

29. The process of claim 28, wherein said treating step comprises applying a coating to the part.

30. The process of claim 28, wherein said coating is selected from the group of coatings consisting of ceramic, metallic, organic, and inorganic coatings, and combinations thereof.

31. A process for making a metal part having internal and external surfaces, a thickness, and an axis, comprising:
  (a) generating a computer file of the part, wherein the part is comprised of adjacent cross sections;
  (b) making a first mandrel by modifying the computer file of the part to form a computer file of the mandrel, and guiding, by means of the mandrel computer file, an ultraviolet energy beam onto a photosensitive liquid polymeric medium to form and join together adjacent cross sections of the mandrel, wherein the first mandrel has a surface, an axis and is comprised of adjacent cross sections, and each cross section of said first mandrel corresponding to a cross section of the part, and wherein the surface of the first mandrel and the internal surface of the part are offset by an amount equal to zero;
  (c) making a second mandrel by modifying the computer file of the part to form a computer file of the mandrel, and guiding, by means of the mandrel computer file, an ultraviolet energy beam onto a photosensitive liquid polymeric medium to form and join together adjacent cross sections of the mandrel, wherein the second mandrel has a surface, and axis and is comprised of adjacent cross sections, and each cross section of said second mandrel corresponding to a cross section of the part, and wherein the surface of the second mandrel is offset from the external surface of the part a constant amount greater than zero; (d) plating a layer of metal onto the surface of the second mandrel, and then removing the metal layer from said surface by embrittling the mandrel and then fracturing the mandrel by force, wherein the layer is comprised of adjacent cross sections, and each cross section of said layer corresponds to a cross section of the part, wherein the thickness of the layer is greater than the thickness of the part;
  (e) assembling the first mandrel in coaxial relation with the metal layer such that corresponding cross sections of the mandrel and the metal layer are aligned with each other, and such that the surface of the first mandrel is spaced from the surface of the layer a constant amount, and such that the first mandrel is radially inward of the metal layer;
  (f) electroplating metal onto the surface of the first mandrel using the metal layer as an anode to form the part on the surface, the electrodeposited metal having a thickness equal to the part thickness; and
  (g) removing the part from the surface of the first mandrel by embrittling the mandrel and then fracturing it by force.

* * * * *